US008273835B2

(12) United States Patent
Littmann et al.

(10) Patent No.: US 8,273,835 B2
(45) Date of Patent: Sep. 25, 2012

(54) METHOD FOR ETHYLENE POLYMERIZATION IN A TUBULAR REACTOR WITH REDUCED OUTPUT

(75) Inventors: Dieter Littmann, Mücke (DE); Andre-Armand Finette, Köln (DE); Hans Joachim Meinke, Weisenheim am Sand (DE)

(73) Assignee: Basell Polyolefine GmbH, Wesseling (DE)

( * ) Notice: Subject to any disclaimer, the term of this patent is extended or adjusted under 35 U.S.C. 154(b) by 15 days.

(21) Appl. No.: 13/144,355

(22) PCT Filed: Jan. 14, 2010

(86) PCT No.: PCT/EP2010/000142

§ 371 (c)(1),
(2), (4) Date: Aug. 23, 2011

(87) PCT Pub. No.: WO2010/081685

PCT Pub. Date: Jul. 22, 2010

(65) Prior Publication Data

US 2011/0294967 A1 Dec. 1, 2011

Related U.S. Application Data

(60) Provisional application No. 61/207,993, filed on Feb. 19, 2009.

(30) Foreign Application Priority Data

Jan. 16, 2009 (EP) .................................... 09000591

(51) Int. Cl.
*C08F 2/00* (2006.01)
*C08F 10/02* (2006.01)
*B01J 19/24* (2006.01)

(52) U.S. Cl. ............. 526/64; 526/86; 526/919; 422/134

(58) Field of Classification Search .................... 526/64, 526/86, 919; 422/134
See application file for complete search history.

(56) References Cited

U.S. PATENT DOCUMENTS 3,334,081 A * 8/1967 Madgwick et al. ............ 526/64
3,405,115 A 10/1968 Schappert
4,135,044 A 1/1979 Beals
4,794,004 A 12/1988 Pfleger
5,187,245 A 2/1993 Nakamura
6,887,955 B2 * 5/2005 Deckers et al. ................ 526/79
2005/0037219 A1 2/2005 Ohlsson
2006/0149004 A1 7/2006 Lee
2007/0032612 A1 2/2007 Fouarge
2011/0301307 A1 12/2011 Littmann

FOREIGN PATENT DOCUMENTS

EP 0121755 A2 10/1984
GB 1569518 6/1980
JP 2003327606 11/2003
WO WO-0001740 1/2000
WO WO-01/14441 3/2001
WO WO-01/93225 12/2001
WO WO-2004/078800 9/2004
WO WO-2004108271 12/2004
WO WO-2005065818 7/2005
WO WO-2007110127 10/2007

* cited by examiner

*Primary Examiner* — Fred M Teskin
(74) *Attorney, Agent, or Firm* — Dilworth IP LLC

(57) ABSTRACT

Process for the preparation of ethylene homopolymers or copolymers in the presence of free-radical polymerization initiators at from 100° C. to 350° C. and pressures in the range of from 160 MPa to 350 MPa in a tubular reactor with at least two spatially separated initiator injection points, wherein injecting initiator rises the temperature of the reaction mixture in the reaction zone following the injection point, and the first initiator injection point of the tubular reactor is not provided with initiator or is provided with so little initiator that the temperature of the reaction mixture does not rise more than 20° C. in the first reaction zone and method for reducing the output of a high pressure tubular reactor for the homo- or copolymerization of ethylene in the presence of free-radical polymerization initiators with at least two initiator injection points, wherein feeding of free-radical polymerization initiator to the first initiator injection point is discontinued or reduced to a level that the temperature of the reaction mixture in the first reaction zone does not rise more than 20° C.

18 Claims, 3 Drawing Sheets

Fresh Ethylene
Modifier
Comonomer
Polymer
1
2
3
4
5a
5b
5c
5d
I1
I2
I3
I4
6
7
8
9
10
11
12
13
14
15
16
17
18

Initiators
Solvent
100a
100b
100c
100d
101a
101b
101c
101d
102a
102b
102c
102d
103a
103b
103c
103d
104a
104b
104c
104d
105a
105b
105c
105d
106a
106b
106c
106d
107a
107b
107c
107d
108a
108b
108c
108d
109a
109b
109c
109d
110a
110b
110c
I1
I2
I3
I4

METHOD FOR ETHYLENE POLYMERIZATION IN A TUBULAR REACTOR WITH REDUCED OUTPUT

This application is the U.S. national phase of International Application PCT/EP2010/000142, filed Jan. 14, 2010, claiming priority to European Patent Application 09000591.9 filed Jan. 16, 2009, and the benefit under 35 U.S.C. 119(e) of U.S. Provisional Application No. 61/207,993, filed Feb. 19, 2009; the disclosures of International Application PCT/EP2010/000142, European Patent Application 09000591.9 and U.S. Provisional Application No. 61/207,993, each as filed, are incorporated herein by reference.

The present invention relates to a process for the preparation of ethylene homopolymers or copolymers in the presence of free-radical polymerization initiators at from 100° C. to 350° C. and pressures in the range of from 160 MPa to 350 MPa in a tubular reactor with at least two spatially separated initiator injection points and to a method for reducing the output of a high pressure tubular reactor for the homo- or copolymerization of ethylene.

BACKGROUND OF THE INVENTION

Polyethylene is one of the most frequently used commercial polymers. It can be prepared by a couple of different processes. Polymerization in the presence of free-radical initiators at elevated pressures was the method first discovered to obtain polyethylene and continues to be a valued process with high commercial relevance for the preparation of low density polyethylene (LDPE). LDPE is a versatile polymer which can be used in a variety of applications, such as film, coating, molding, and wire and cable insulation. There is consequently still demand for building new polymerization plants for obtaining LDPE and very often polymerization in tubular reactors is selected as technology for these new plants, especially because it was possible to increase the capacity of such tubular reactor LDPE plants significantly.

A normal set-up for a tubular reactor LDPE plant consists essentially of a set of two compressors, a primary and a high pressure compressor, a tubular polymerization reactor and two separators for separating the monomer-polymer mixture leaving the tubular reactor, wherein in the first separator, the high pressure separator, the ethylene separated from the monomer-polymer mixture is recycled to the ethylene-feed between the primary compressor and the high pressure compressor, and the ethylene separated from the mixture in the second separator, the low pressure separator, is added to the stream of fresh ethylene before it is fed to the primary compressor. Monomer supply to the tubular reactor can either be carried out solely in the beginning of the reactor or only partly in the beginning with the other part fed via one or more side feed entries. Moreover, it is also common to introduce the initiators in multiple places down the tube, thus creating multiple reaction zones. Such a set-up is state of the art and, for example, described for a specific embodiment in WO 2004/108271. It is further common, to use initiator mixtures. WO 2004/078800 describes a method of selecting initiator mixtures with respect to minimum initiator costs, for instance.

The polymerization process in a tubular LDPE reactor is carried out at high pressures which can reach even 350 MPa. Such high pressure requires special technology for the process to be handled in a safe and reliable manner. Moreover, it needs a lot of energy to compress the monomers to the high pressures of the reaction.

The properties and the structure of the obtained LDPE, such as molecular weight, molecular weight distribution and the amount of short- and long-chain branching, depend strongly on the reaction parameters pressure and temperature. That means, control of the reaction conditions is essential. There are of course additional possibilities to influence the nature of the produced LDPE, for example the addition of chain-transfer agents, which reduce the molecular weight, however in general the possibilities to vary the reaction conditions while obtaining a specific target product are quite limited. A further limiting factor for the production of LDPE is heat removal from the reactor, because the heat of polymerization of ethylene is relatively high. That means, for obtaining different grades of LPPE, i.e., polymers which differ in melt flow rate (MFR) and density, it is in general necessary to adjust the operating parameters, which might result in different output rates.

Moreover, if the temperature rises too much in the reactor, there is the risk that the ethylene decomposes to carbon and a mixture of methane and hydrogen, which leads to rapidly increasing pressure in the reactor requiring an emergency shut-down of the plant via a relief valve or a burst disk. However, such situations are highly undesirable.

As long as a polymerization plant is operated in normal mode, the operator will always try to run the plant with full or even higher load, since a major part of the production costs for a polymer are investment costs for the plant and the higher the load of a plant the lower are the proportionate investment costs for the produced polymer. However, there might be exceptional circumstances that require that the output of a polyethylene plant has to be reduced, for example if another facility fails or is shut down. That could be on the side of the feedstock, e.g., an ethylene producing cracker is turned off and it is not possible to compensate, for example, via a pipeline network or from storage tanks; or it could be on the side of the product, e.g., there exists a problem with logistics and the manufactured material cannot be shipped.

It turns out more and more frequently, especially for polymerization plants with capacities of 200 kt/y and more, that flexible ethylene consumption for a limited period of time is needed. There are presently however only limited options. There is of course the possibility to reduce the amount of added initiator. However, if the further reaction parameters are kept constant, the reaction temperature decreases and the properties of the obtained polyethylenes change.

It is further possible to varying the suction conditions of the high pressure compressor, i.e., reducing the ethylene consumption of the compressor. However, that results at the most in a reduction of the output of the plant of about 10%. The temperature of the monomer feed to the tubular reactor can be increased by increasing the pre-heater temperature, which also reduces the output. This measure, however, is practically limited in terms of output reduction to a maximum of about 5%. Furthermore, there is the opportunity to increase the inlet cooling medium temperature to the reactor, which will result in a significantly reduced heat transfer from reactor to reactor cooling media entailing an output reduction of up to 10%. All those measures however imply severe changes of the reactor conditions and need numerous adjustments of to the polymerization conditions to balance those changes and are moreover even combined insufficient. There is of course additionally the possibility to change the produced grades, however that also allows only for a limited reduction of output and it might require production of grades, which are not suited to the market needs at that point of time.

There could be a solution for this problem by constructing new tubular reactor LDPE plants with a set of two high pressure compressors instead of only one. It would then be theoretically possible to run the plant with only one of the two high pressure compressors and consequently cutting the output in half. Some older tubular reactor LDPE plants with relatively low capacity are indeed constructed in such a way. However, the investment costs for a pair of two compressors are much higher than that for only one with the same capacity and moreover it is not even possible to operate a tubular reactor with significantly reduced output is this way. By cutting the monomer intake in half the gas velocity within the tubular reactor is severely reduced, which negatively impacts heat removal and consequently the product properties and furthermore also enhances the risk of spontaneous decomposition of ethylene.

BRIEF SUMMARY OF THE INVENTION

Accordingly, it is an object of the present invention to remedy the disadvantages mentioned and to find a method for flexibly varying the capacity of tubular LDPE reactors, which easily allows to reduce significantly the output of such a reactor and thereafter to bring it back to the original value without adversely affecting the properties of the produced polymers. We have found that this object is achieved by a process for the preparation of ethylene homopolymers or copolymers in the presence of free-radical polymerization initiators at from 100° C. to 350° C. and pressures in the range of from 160 MPa to 350 MPa in a tubular reactor with at least two spatially separated initiator injection points, wherein injecting initiator rises the temperature of the reaction mixture in the reaction zone following the injection point, and the first initiator injection point of the tubular reactor is not provided with initiator or is provided with so little initiator that the temperature of the reaction mixture does not rise more than 20° C. in the first reaction zone.

Furthermore, we have found a method for reducing the output of a high pressure tubular reactor for the homo- or copolymerization of ethylene in the presence of free-radical polymerization initiators with at least two initiator injection points, wherein feeding of free-radical polymerization initiator to the first initiator injection point is discontinued or reduced to a level that the temperature of the reaction mixture in the first reaction zone does not rise more than 20° C.

BRIEF DESCRIPTION OF THE DRAWINGS

The features and advantages of the present invention can be better understood via the following description and the accompanying drawings, where.

DETAILED DESCRIPTION OF THE INVENTION

Figure 1:
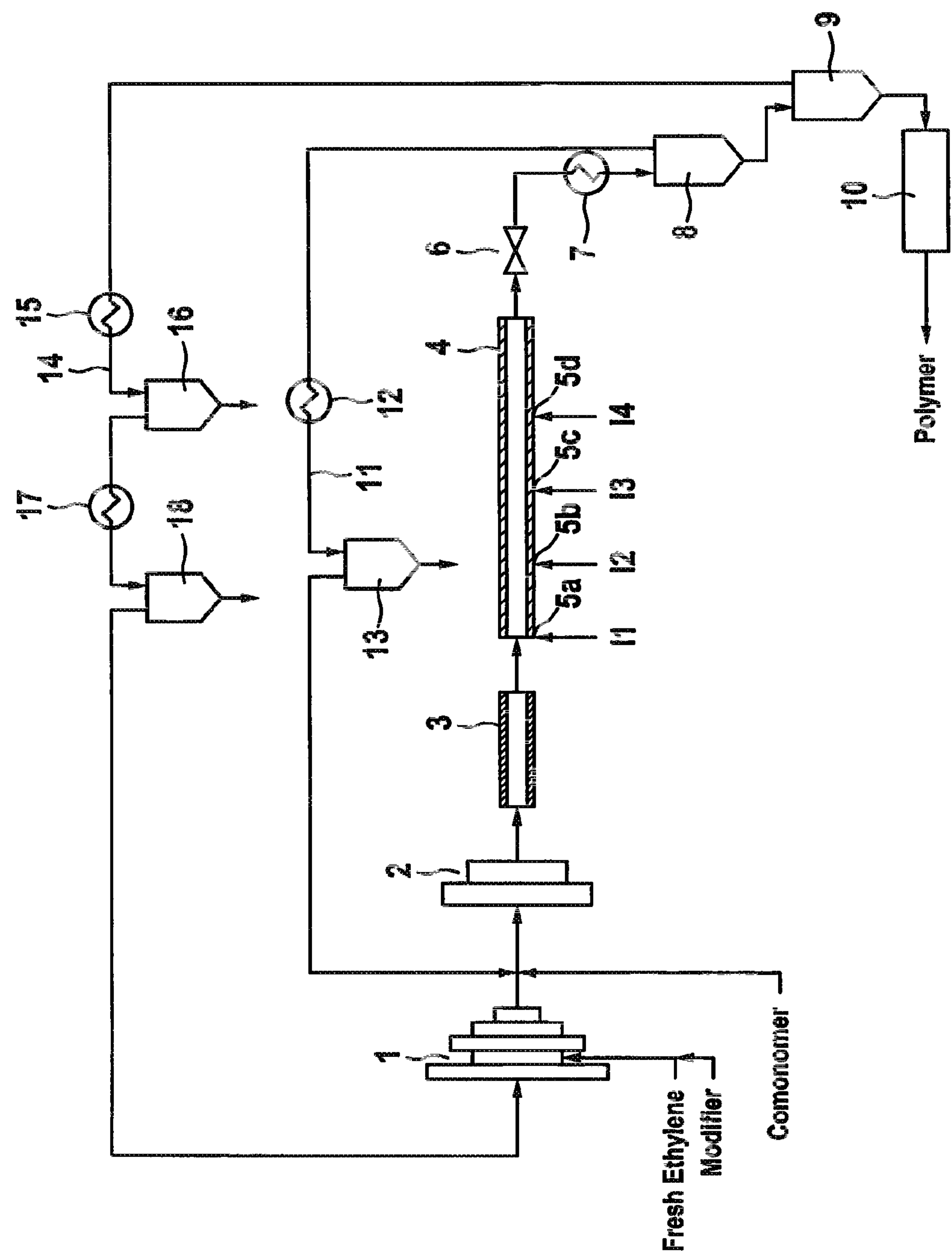
FIG. 1 shows schematically the set-up of a tubular polymerization reactor.

The process of the invention can be used both for the homopolymerization of ethylene and for the copolymerization of ethylene with one or more other monomers, provided that these monomers are free-radically copolymerizable with ethylene under high pressure. Examples of suitable copolymerizable monomers are β,β-unsaturated $C_3$-$C_8$-carboxylic acids, in particular maleic acid, fumaric acid, itaconic acid, acrylic acid, methacrylic acid and crotonic acid, derivatives of α,β-unsaturated $C_3$-$C_8$-carboxylic acids, e.g. unsaturated $C_3$-$C_{15}$-carboxylic esters, in particular esters of $C_1$-$C_6$-alkanols, or anhydrides, in particular methyl methacrylate, ethyl methacrylate, n-butyl methacrylate or tert-butyl methacrylate, methyl acrylate, ethyl acrylate, n-butyl acrylate, 2-ethylhexyl acrylate, tert-butyl acrylate, methacrylic anhydride, maleic anhydride or itaconic anhydride, and α-olefins such as propene, 1-butene, 1-pentene, 1-hexene, 1-octene or 1-decene. In addition, vinyl carboxylates, particularly preferably vinyl acetate, can be used as comonomers. n-Butyl acrylate, acrylic acid or methacrylic acid are particularly advantageously used as comonomer. In the case of copolymerization, the proportion of comonomer or comonomers in the reaction mixture is from 1 to 45% by weight, preferably from 3 to 30% by weight, based on the amount of monomers, i.e. the sum of ethylene and other monomers. Depending on the type of comonomer, it can be preferred to feed the comonomers at a plurality of different points to the reactor.

For the purposes of the present invention, polymers are all substances which are made up of at least two monomer units. They are preferably LDPE polymers having a mean molecular weight $M_n$ of more than 20000 g/mole. However, the method of the invention can also be advantageously employed in the preparation of oligomers, waxes and polymers having a molecular weight $M_n$ of less than 20000 g/mole.

In the preparation of highly viscous products, e.g. MFR (190° C./2.16 kg)<1 g/10 min, it can be advantageous to add the monomer or monomers not only at the inlet of the reactor tube but to feed in monomers at a plurality of different points on the reactor. This is particularly preferably done at the beginning of further reaction zones.

In the process of the invention, the molecular weight of the polymers to be prepared can as usual be controlled by addition of modifiers which act as chain-transfers agents. Examples of suitable modifiers are hydrogen, aliphatic and olefinic hydrocarbons, e.g. pentane, hexane, cyclohexane, propene, 1 pentene or 1-hexene, ketones such as acetone, methyl ethyl ketone (2-butanone), methyl isobutyl ketone, methyl isoamyl ketone, diethyl ketone or diamyl ketone, aldehydes such as formaldehyde, acetaldehyde or propionaldehyde and saturated aliphatic alcohols such as methanol, ethanol, propanol, isopropanol or butanol. Particular preference is given to using saturated aliphatic aldehydes, in particular propionaldehyde or α-olefins such as propene or 1-hexene.

Possible initiators for starting the free-radical polymerization in the respective reaction zones are, for example, air, oxygen, azo compounds or peroxidic polymerization initiators. Initiation using organic peroxides or azo compounds represents a particularly preferred embodiment of the process of the invention. Examples of suitable organic peroxides are peroxy esters, peroxy ketals, peroxy ketones and peroxycarbonates, e.g. di(2-ethylhexyl) peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethyl-hexanoylperoxy)hexane, tert-amyl peroxy-2-ethylhexanoate, dibenzoyl peroxide, tert butyl peroxy-2-ethyl hexanoate, tert-butyl peroxydiethylacetate, tert-butyl peroxydiethylisobutyrate, tert-butyl peroxy-3,5,5-trimethylhexanoate, 1,1-di(tert-butylperoxy)-3,3,5-trimethylcyclohexane, 1,1-di(tert-butylperoxy)

cyclohexane, tert butyl peroxyacetate, cumyl peroxyneodecanoate, tert-amyl peroxyneodecanoate, tert-amyl peroxypivalate, tert-butyl peroxyneodecanoate, tert-butyl permaleate, tert-butyl peroxypivalate, tert-butyl peroxyisononanoate, diisopropylbenzene hydroperoxide, cumene hydroperoxide, tert butyl peroxybenzoate, methyl isobutyl ketone hydroperoxide, 3,6,9-triethyl-3,6,9-trimethyl-triperoxocyclononane and 2,2-di(tert-butylperoxy)butane. Azoalkanes (diazenes), azodicarboxylic esters, azodicarboxylic dinitriles such as azobisisobutyronitrile and hydrocarbons which decompose into free radicals and are also referred as C—C initiators, e.g. 1,2-diphenyl-1,2-dimethylethane derivatives and 1,1,2,2-tetramethylethane derivatives, are also suitable. It is possible to use either individual initiators or preferably mixtures of various initiators. A large range of initiators, in particular peroxides, are commercially available, for example the products of Akzo Nobel offered under the trade names Trigonox® or Perkadox®.

In a preferred embodiment of the process of the invention, peroxidic polymerization initiators having a relatively high decomposition temperature are used. Suitable peroxidic polymerization initiators include, for example, 1,1-di(tert-butylperoxy)cyclohexane, 2,2-di(tert-butylperoxy)butane, tert-butyl peroxy-3,5,5-trimethylhexanoate, tert-butyl peroxybenzoate, 2,5-dimethyl-2,5-di(tert-butylperoxy)hexane, tert-butyl cumyl peroxide, di-tert-butyl peroxide and 2,5-dimethyl-2,5-di(tert-butylperoxy)hex-3-yne, and particular preference is given to using di-tert-butyl peroxide.

The initiators can be employed individually or as a mixture in concentrations of from 0.1 to 50 mol/t of polyethylene produced, in particular from 0.2 to 20 mol/t, in each zone. It is often advantageous to use the initiators in the dissolved state. Examples of suitable solvents are ketones and aliphatic hydrocarbons, in particular octane, decane and isododecane and also other saturated $C_8$-$C_{25}$-hydrocarbons. The solutions comprise the initiators or initiator mixtures in proportions of from 2 to 65% by weight, preferably from 5 to 40% by weight and particularly preferably from 10 to 30% by weight. Particular preference is given to using mixtures of initiators which have different decomposition temperatures.

The process of the invention is carried out at pressures of from 160 MPa to 350 MPa, with pressures of from 180 MPa to 340 MPa being preferred and pressures of from 200 MPa to 330 Pa being particularly preferred. The temperatures are in the range from 100° C. to 350° C., preferably from 120° C. to 340° C. and very particularly preferably from 150° C. to 320° C. In the case of copolymerization of ethylene with sensitive or strongly regulating comonomers, in particular free radically polymerizable carboxylic esters, e.g. vinyl esters, the polymerization is preferably carried out at temperatures below 230° C. In general, preference is given to a process in which the polymerization temperature is not higher than 320° C.

The flowing reaction mixture generally comprises polyethylene in an amount in the range from 0% by weight to 45% by weight, based on the total monomer-polymer mixture, preferably from 0% by weight to 35% by weigh.

The process of the present invention can be carried out with all types of tubular reactors suitable to high-pressure polymerization provided the tubular reactor has at least two spatially separated initiator injection points. FIG. 1 shows a typical set-up for a suitable tubular polymerization reactor without however restricting the invention to the embodiments described therein.

The fresh ethylene, which is usually under a pressure of 1.7 MPa, is firstly compressed to a pressure of about 30 MPa by means of a primary compressor (1) and then compressed to the reaction pressure of about 300 MPa using a high pressure compressor (2). The molecular weight regulator is added to primary compressor (1). The reaction mixture leaving the high pressure compressor (2) is fed to pre-heater (3), where the reaction mixture is preheated to the reaction start temperature of from about 120° C. to 220° C., and then conveyed to the tubular reactor (4).

The tubular reactor (4) is basically a long, thick-walled pipe with cooling jackets to remove the liberated heat of reaction from the reaction mixture by means of a coolant circuit (not shown). It is usually from about 0.5 km to 4 km, preferably from 1.5 km to 3 km and especially from 2 km to 2.5 km long. The inner diameter of the pipe is usually in the range of from about 30 mm to 120 mm and preferably from 60 mm to 90 mm. The tubular reactor (1) has usually a length-to-diameter ratio of greater than 1000, preferably from 10000 to 40000 and especially from 25000 to 35000.

The tubular reactor (4) shown in FIG. 1 has four spatially separated initiator injection points (5*a*) to (5*d*) for feeding initiators or initiator mixtures I1 to I4 to the reactor and accordingly also four reaction zones if initiator is fed to all four initiator injection points. In general, it is sufficient for the present invention that the tubular reactor has two spatially separated initiator injection points. Preferably, the number of spatially separated initiator injection points is from three to six, and especially four.

By feeding suitable free-radical initiators to the tubular reactor, which decompose at the temperature of the reaction mixture, the polymerization reaction starts. The generated heat of the reaction rises the temperature of the reaction mixture, since more heat is generated than can be removed through the walls of the tubular reactor. The rising temperature increases the rate of decomposition of the free-radical initiators and accelerates polymerization until all free-radical initiators are consumed. Thereafter no further heat is generated and the temperature decreases again since the temperature of the reactor walls is lower than that of the reaction mixture. Accordingly, the part of the tubular reactor downstream of an initiator injection point, in which the temperature rises, is the reaction zone, while the part thereafter, in which the temperature decreases again, is predominantly a cooling zone.

The amount and nature of added free-radical initiators determines how much the temperature rises and accordingly allows adjusting that value. Normally, the temperature rise in the first reaction zone is set to be in the range of from 70° C. to 170° C. and 50° C. to 130° C. for the subsequent reaction zones depending on the product specifications and reactor configuration. The reaction mixture leaves the tubular reactor (4) through a high-pressure let-down valve (6) and passes a post reactor cooler (7). Thereafter, the resulting polymer is separated off from unreacted ethylene and other low molecular weight compounds (monomers, oligomers, polymers, additives, solvent, etc) by means of a high-pressure separator (8) and a low-pressure separator (9), discharged and pelletized via an extruder and granulator (10).

The ethylene which has been separated off in the high-pressure separator (8) is fed back to the inlet end of the tube reactor (4) in the high-pressure circuit (11) at 30 MPa. It is first freed from other constituents in at least one purification stage and then added to the monomer stream between primary compressor (1) and high pressure compressor (2). FIG. 1 shows one purification stage consisting of a heat exchanger (12) and a separator (13). It is however also possible to use a plurality of purification stages. The high-pressure circuit (11) usually separates waxes.

The ethylene which has been separated off in the low-pressure separator (9), which further comprises, inter alia, the major part of the low molecular weight products of the polymerization (oligomers) and the solvent, is worked up in the low-pressure circuit (14) at a pressure of from about 0.1 to 0.4 MPa in a plurality of separators with a heat exchanger being located between each of the separators. FIG. 1 shows two purification stages consisting of heat exchangers (15) and (17) and separators (16) and (18). It is however also possible to use only one purification stages or preferably more than two purification stages. The low-pressure circuit (14) usually separates oil and waxes.

According to the present invention, feeding of free-radical polymerization initiator to the first initiator injection point of the tubular reactor is discontinued so that no polymerization reaction takes place in the part of the tubular reactor following the first initiator injection point, or so little initiator is fed to the first initiator injection point of the tubular reactor that the temperature of the reaction mixture in the first reaction zone following the first initiator injection point does not rise more than 20° C.

It is possible that only the first initiator injection point of the tubular reactor is not provided with initiator or is provided with so little initiator that the temperature of the reaction mixture does not rise more than 20° C. in the first reaction zone. Is however also possible that the first initiator injection point of the tubular reactor and one or more other initiator injection point of the tubular reactor are not provided with initiator or are provided with so little initiator that the temperature of the reaction mixture does not rise more than 20° C. in the reaction zones following these initiator injection points, as long as there remains at least one reaction zone for obtaining ethylene homopolymers or copolymers, which is operated with a higher, preferably significant higher temperature rise. The number of spatially separated initiator injection points, which are not provided with initiator or are provided with a reduced amount of initiator, may be, for example, two, three or four. Preferably in such a set-up, the first two initiator injection points of the tubular reactor are among those, which are not provided with initiator or are provided with so little initiator that the temperature of the reaction mixture does not rise more than 20° C. in the first two reaction zones.

In preferred embodiments of the present invention the cutback of feeding initiator to the initiator injection points of the tubular reactor is complete. That means, no initiator is fed to the first initiator injection point of the tubular reactor or no initiator is fed to the first and one or more other initiator injection point of the tubular reactor, preferably including the first two initiator injection points of the tubular reactor.

The cutback of feeding free-radical polymerization initiator to the initiator injection points brings about that there is very little polymerization in the respective reaction zone or no polymerization at all occurs in the part of the tubular reactor following the respective initiator injection point. As a result the reactor output of ethylene homopolymers or copolymers is reduced although the amount of ethylene fed from the high pressure compressor to the reactor does not change and therefore also the flow velocity of the reaction mixture remains essentially unchanged. Accordingly, the flow conditions in the reactor are not affected significantly.

The process allows easily reducing the output of tubular reactors of any capacity and does not fail for reactors, which are designed to prepare ethylene homopolymer or copolymer with relatively high capacities, i.e., with capacities of more than 200 kt/y, of more than 300 kt/y, of more than 400 kt/y, or even with higher capacity. Moreover, the process of the present invention can be carried out with all types of LDPE grades. That means, even if there exists a restriction which requires a reduction of the output it allows to produce that grade which is most sorely needed and not that grade which allows, with conventional operation mode, the lowest output.

Preferably at least one of the initiator injection points of the tubular reactor is provided with initiator in form of an initiator mixture. It is especially preferred that all initiator injection points, which are provided with initiator, are provided with initiator in form of an initiator mixture. If there is no or very little initiator fed to an initiator injection point, the conditions in the reaction zone following the next regularly operated initiator injection point are different to the conditions, which are in effect at his point if the tubular reactor is operated in normal mode. Consequently, it is preferred to alter the composition of the initiator mixtures. The process of the present invention is therefore preferably carried out with a flexible dosing system for the initiators which allows a fast change of initiators or initiator mixtures fed to the initiator injection points. Such a metering system is preferably an automated dosing system.

Figure 2:
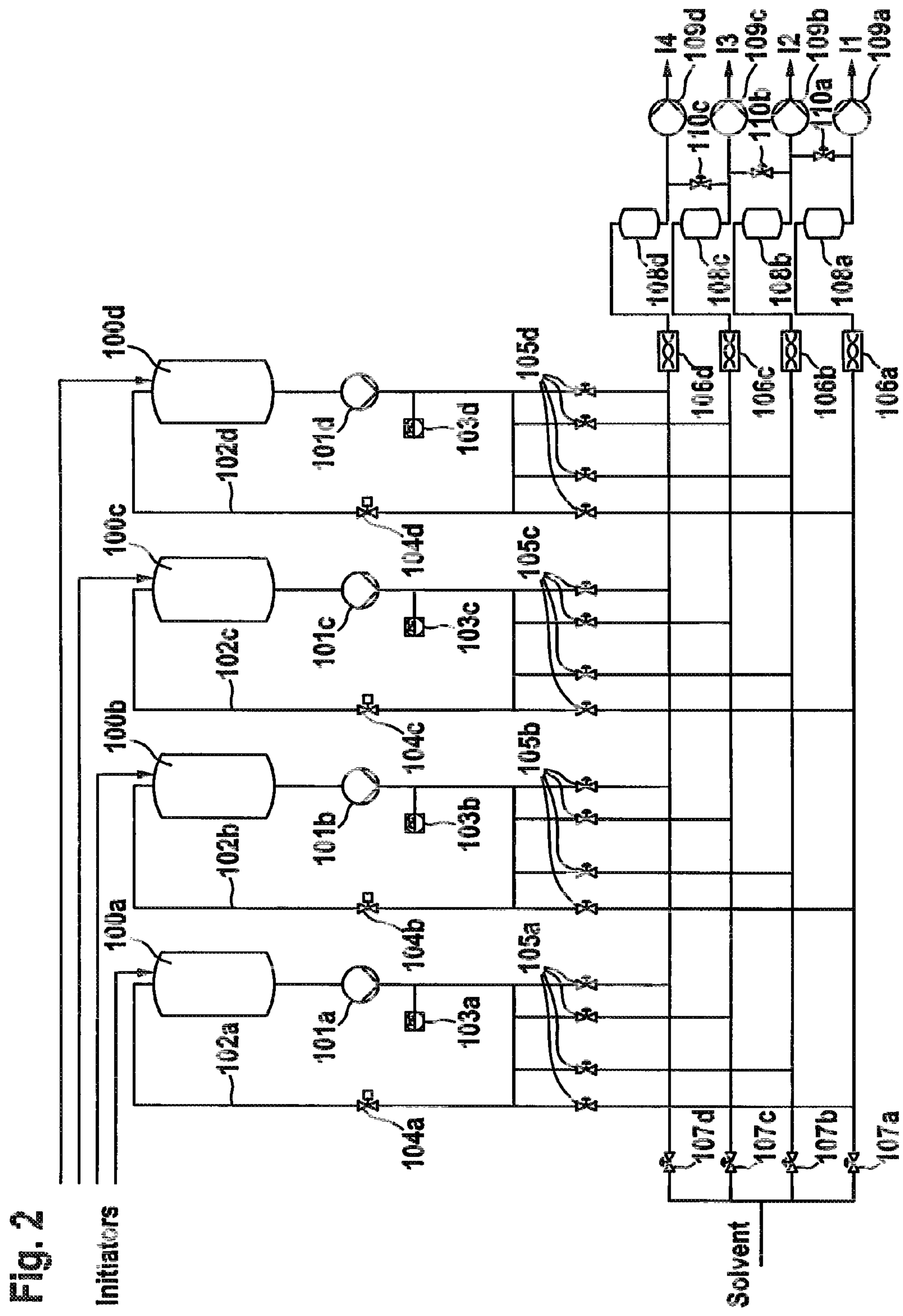
FIG. 2 shows the set-up of a peroxide metering system which can preferably be used to initiate the polymerization reaction.

FIG. 2 shows a preferred embodiment for a flexible dosing system for a tubular reactor with four initiator injection point, which provides the possibility to meter four different initiators or initiator mixtures, wherein each initiator mixture can be composed of up to four different initiators. This dosing system has accordingly four storage tanks (100*a*, 100*b*, 100*c*, 100*d*) for holding initiator solutions or liquid initiators. In case it is desired to allow initiator mixtures of more than four initiators, that means, for example, five, six or seven initiators, it is of course possible to enlarge such a flexible dosing system will additional storage tanks and related equipment. These storage tanks can be filled up from conventional equipment to hold or transport chemical compounds, which can for example be bulk storage, Intermediate Bulk Containers (IBC) or small canisters. The initiators are conveyed by pumps from the storage tanks (100*a*, 100*b*, 100*c*, 100*d*) through valves (105*a*, 105*b*, 105*c*, 105*d*) to static mixers (106*a*, 106*b*, 106*c*, 106*d*). To provide constant conditions in front of the mixing points it is preferred that the initiators are not taken directly from the storage tanks (100*a*, 100*b*, 100*c*, 100*d*) but from circulation lines (102*a*, 102*b*, 102*c*, 102*d*), in which pumps (101*a*, 101*b*, 101*c*, 101*d*) circulate the content of tanks (100*a*, 100*b*, 100*c*, 100*d*) through pressure control valves (104*a*, 104*b*, 104*c*, 104*d*), which are controlled by pressure sensors (103*a*, 103*b*, 103*c*, 103).

The up to four initiators coming from the storage tanks are mixed in static mixers (106*a*, 106*b*, 106*c*, 106*d*), wherein the ratio of the initiators in the mixture is regulated by controlled opening of valves (105*a*, 105*b*, 105*c*, 105*d*). Furthermore it is possible to add additional solvent via valves (107*a*, 107*b*, 107*c*, 107*d*). The mixtures obtained in these static mixers are then conveyed to the initiators injection points of the tubular reactor. Preferably the mixtures obtained by the static mixers are first metered to buffer tanks (108*a*, 108*b*, 108*c*, 108*d*) and then conveyed by further pumps (109*a*, 109*b*, 109*c*, 109*d*) to the injection points. In a further preferred embodiment of such a dosing system there is also the possibility that the mixture of one buffer tank is fed via one more connection valves (110*a*, 110*b*, 110*c*) to more than one initiator injection point.

In a preferred embodiment, the process of the present invention includes a process for feeding initiator comprising the steps a) providing at least two different initiators as solution in a suitable solvent or in liquid state, b) mixing the initiators and optionally additional solvent in at least two static mixers and c) feeding each of the mixtures to a different initiator injection point of the high pressure reactor.

Preferably all initiator injection points, which are provided with initiator, are provided with initiator in form of an initiator mixture and all initiator mixtures are obtained by being mixed in a static mixer.

Figure 3:
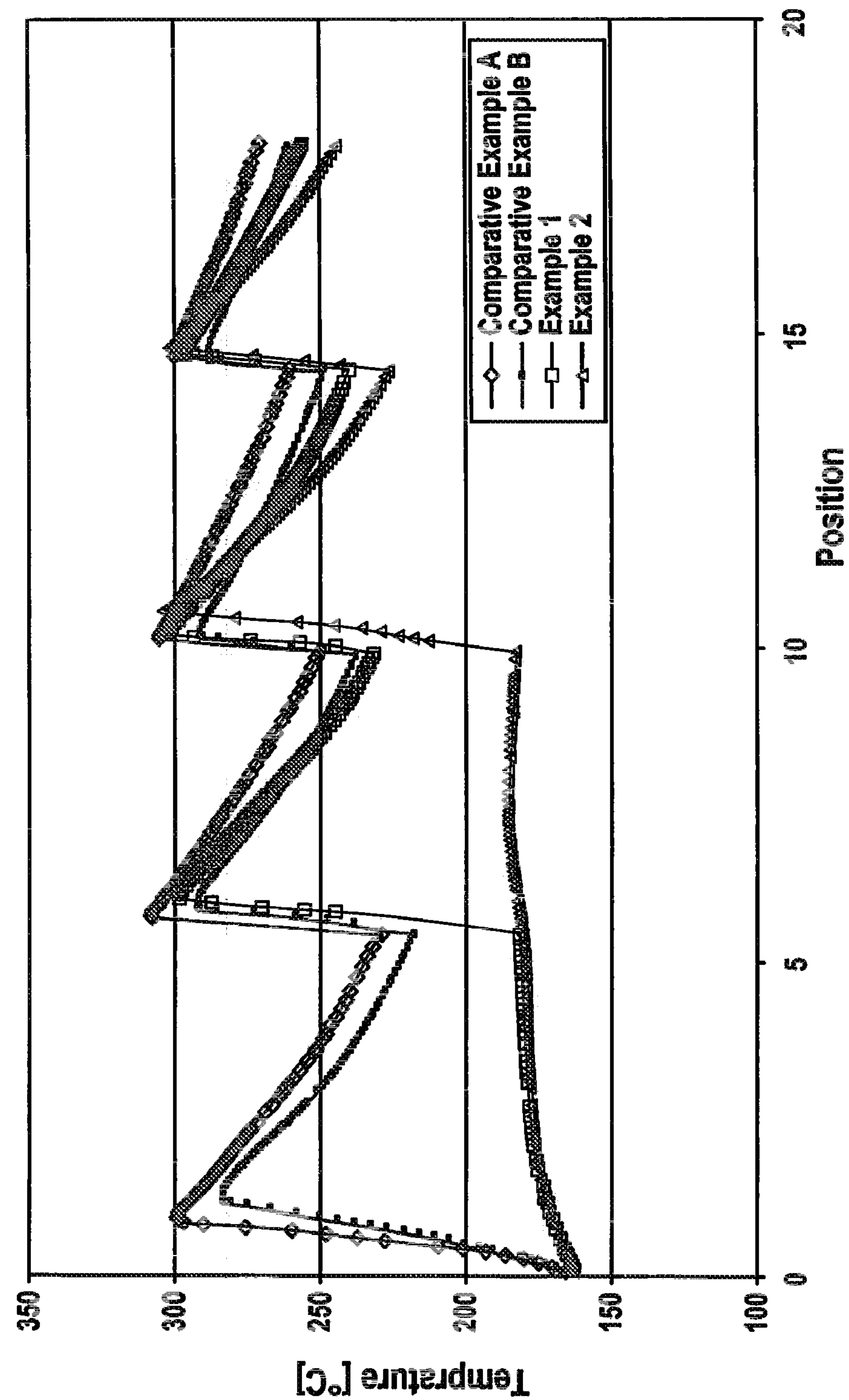
FIG. 3 shows temperature profiles of a tubular reactor with four initiator injection points while producing a LDPE according to the process of the present invention and according to normal mode of operation.

FIG. 3 shows the temperature profile of a tubular reactor referring to the production of a LDPE of a density of 0.924 g/cm$^3$ and a MFR (190° C./2.16 kg) determined according to DIN EN ISO 1133:2005 of 0.8 g/10 min as described in the examples. The tubular reactor is equipped with four initiator injection points and has accordingly four reaction zones. The monomer mixture enters the tubular reactor with a temperature which is adjusted by the conditions of the pre-heater. A first initiator or initiator mixture is fed to the first initiator injection point. Caused by the exothermic polymerization reaction, the temperature of the reaction mixture rises quickly to a maximum and then, after consumption of the polymerization initiators, decreases slowly until the next initiator injection point is reached. Additional initiator is metered and the temperature rises again quickly. After having reached a maximum the temperature decreases again. This is repeated for each of the initiator injection point 2, 3 and 4, until finally the reaction mixture leaves the reactor. Since the temperature of the reaction mixture at the second initiator injection point is higher than that of the reaction mixture at the first initiator injection point, the temperature of the reaction mixture at the third initiator injection point is higher than that of the reaction mixture at the second initiator injection point and the temperature of the reaction mixture at the forth initiator injection point is higher than that of the reaction mixture at the third initiator injection point it is advantageous to use different initiator mixtures to obtain an optimized reaction behavior.

The graphs of examples 1 and 2 show the temperature profile for inventive processes. In example 1, there is no initiator fed to the first initiator injection point and in examples 2 there is no initiator fed to the first and the second initiator injection point. The graphs show that there is a slight temperature increase of the reaction mixture in the part of the tubular reactor following the first initiator injection point because the temperature of the cooling jacket of this part of the tubular reactor is higher than that of the pre-heater. However, it is obvious that no exothermal polymerization occurs. After the first injection of initiator the temperature quickly rises and after reaching a maximum then slowly decreases until the next initiator is fed. Since the temperature of the reaction mixture at the second initiator injection point in Example 1 and at the third initiator injection point in Example 2 differs significantly from the temperatures of the reaction mixture in Comparative Example A the nature of the initiator should be adapted and an initiator mixture very similar to the mixture fed to the first initiator injection point in Comparative Example A is preferably used for the second initiator injection point in Example 1 and for the third initiator injection point in Example 2.

The present invention provides a method for reducing the output of a high pressure tubular reactor for the homo- or copolymerization of ethylene in the presence of free-radical polymerization initiators with at least two initiator injection points, wherein feeding of free-radical polymerization initiator to the first initiator injection point is discontinued or reduced to a level that the temperature of the reaction mixture in the first reaction zone does not rise more than 20° C. This method can also be carried out if in normal mode of operation more than 20 tons of ethylene homopolymer or copolymer or even more than 40 or more than 60 tons of ethylene homopolymers or copolymers are produced per hour. The method allows that the flow velocity of the reaction mixture remains essentially unchanged if the output of the tubular reactor is reduced.

There is furthermore the possibility to combine the method of the present invention for reducing the output with other, though limited possibilities to reduce the output of the reactor as, for example, varying the suction conditions of the high pressure compressor, increasing the pre-heater temperature or increasing the inlet cooling medium temperature. That means for example for a tubular reactor with four initiator injection points, of which only the last two are used for polymerization, it is not only possible to reduce the output to approximately 50% of the output of the normal mode of operation but to approximately 40% of the normal mode output.

The invention is illustrated below with the aid of examples, without being restricted thereto.

EXAMPLES

The polymerization was carried out in a high-pressure tubular reactor of the design shown in FIG. 1 with four initiator injection points having in total a length of 1800 m and a diameter of 62 mm. Propionaldehyde was used as molecular weight regulator in a range of 1.5 to 2 kg per ton of produced polyethylene. It was added to the fresh ethylene stream entering the primary compressor (1).

The polymerization initiators were metered to the tubular reactor with a set-up as shown in FIG. 2, using isododecane as additional solvent. The initiators used were di-tert-butyl peroxide (DTBP), tert-butyl peroxy-3,5,5-trimethylhexanoate (TBPIN), tert-butyl peroxypivalate (TBPP) and tert-butyl peroxyneodecanoate (TBPND).

All examples were carried out using an ethylene throughput of the high pressure compressor of 88 metric tons/h and a reactor inlet pressure of 290 MPa.

The melt flow rate MFR was determined according to DIN EN ISO 1133:2005, condition D at a temperature of 190° C. under a load of 2.16 kg.

Density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

Haze was determined according to ASTM D 1003-00 using 50 μm thickness blown film extruded at a melt temperature of 180° C. and a blow-up ratio of 2:1.

Gloss was determined at 20° according to ASTM D 2457-03 using 50 μm thickness blown film extruded at a melt temperature of 180° C. and a blow-up ratio of 2:1.

Comparative Example A

A polymerization with feeding initiators mixtures to all four initiator injection points was carried out. The nature and the relative amounts of the selected components are shown in Table 1. It was fed so much initiator to the initiator injection points that a maximum temperature of the reaction mixture in the reaction zone following the respective injection point in the range of from 300 to 305° C. was obtained. The temperature profile of the tubular reactor with a temperature increase in all four reaction zones is shown in FIG. 3 and the properties of the polymer are depicted in Table 2.

Comparative Example B

A polymerization with feeding initiators mixtures to all four initiator injection points was carried out. The nature and the relative amounts of the selected components for each injection point were identical to that of Comparative Example A. Exactly half the amounts of the initiator mixtures of Comparative Example A were fed to all injection points. The temperature profile of the tubular reactor with a temperature increase in all four reaction zones is shown in FIG. 3 and the properties of the polymer are depicted in Table 2.

While feeding exactly half of the initiator amount, the polyethylene production was only reduced by 18.2%. The MFR changed however by 40%.

Example 1

The polymerization was carried out in identical manner as in Comparative Example A, that means inter alia with the same ethylene throughput of the high pressure compressor, however without feeding any initiator to the first initiator injection point. It was fed so much initiator to the remaining three initiator injection points that a maximum temperature of the reaction mixture in the range of from 300 to 305° C. was obtained in each reaction zone following those injection points. The temperature profile of the tubular reactor is shown in FIG. 3. The nature and the amount of the selected components of initiators mixtures for the remaining initiator injection points are shown in Table 1. The properties of the polymer are depicted in Table 2.

It was possible to obtain polymers with essentially the same properties; however the polyethylene production was reduced by 22.6%.

Example 2

The polymerization was carried out in identical manner as in Comparative Example A and in Example 1, that means inter alia with the same ethylene throughput of the high pressure compressor, however without feeding any initiator to the first and the second initiator injection points. It was fed so much initiator to the remaining two initiator injection points that a maximum temperature of the reaction mixture in the range of from 300 to 305° C. was obtained in each reaction zone following those injection points. The temperature profile of the tubular reactor is shown in FIG. 3. The nature and the amount of the selected components of initiators mixtures for the remaining initiator injection points are shown in Table 1. The properties of the polymer are depicted in Table 2.

It was possible to obtain polymers with essentially the same properties; however the polyethylene production was reduced by 52.6%.

TABLE 1

| | Comparative Examples A and B | | Example 1 | | Example 2 | |
|---|---|---|---|---|---|---|
| | Initiator | Amount [mol/mol] | Initiator | Amount [mol/mol] | Initiator | Amount [mol/mol] |
| Injection point 1 | DTBP | 1 | | | | |
| | TBPIN | 0.75 | | | | |
| | TBPP | 0.9 | | | | |
| | TBPND | 0.5 | | | | |
| Injection point 2 | DTBP | 1 | DTBP | 1 | | |
| | TBPIN | 0.1 | TBPIN | 0.75 | | |
| | | | TBPP | 0.9 | | |
| | | | TBPND | 0.3 | | |
| Injection point 3 | DTBP | 1 | DTBP | 1 | DTBP | 1 |
| | TBPIN | 0.1 | TBPIN | 0.1 | TBPIN | 0.75 |
| | | | | | TBPP | 0.9 |
| | | | | | TBPND | 0.3 |
| Injection point 4 | DTBP | 1 | DTBP | 1 | DTBP | 1 |
| | TBPIN | 0.1 | TBPIN | 0.1 | TBPIN | 0.1 |

TABLE 2

| Comparative Example/ Example | Production rate [t/h] | MFR [g/10 min] | Density [g/cm$^3$] | Haze [%] | Gloss |
|---|---|---|---|---|---|
| A | 26.4 | 0.75 | 0.9224 | 8.0 | 42 |
| B | 21.6 | 0.45 | 0.9241 | 7.7 | 43 |
| 1 | 20.4 | 0.78 | 0.9231 | 7.5 | 45 |
| 2 | 12.5 | 0.80 | 0.9247 | 7.0 | 50 |

We claim:

1. A process for the preparation of ethylene homopolymers or copolymers in the presence of free-radical polymerization initiators at from 100° C. to 350° C. and pressures in the range of from 160 MPa to 350 MPa in a tubular reactor with at least two spatially separated initiator injection points, wherein the injecting initiator raises the temperature of the reaction mixture in the reaction zone following the injection point, and the first initiator injection point of the tubular reactor is not provided with initiator or is provided with so little initiator that the temperature of the reaction mixture does not rise more than 20° C. in the reaction zone following the first initiator injection point, wherein the process for feeding initiator comprises the steps a) providing at least two different initiators as a solution in a suitable solvent or in liquid state, b) mixing the initiators and optionally additional solvent in at least two static mixers, and c) feeding each of the mixtures to a different initiator injection point of the tubular reactor, and at least one of the initiator injection points of the tubular reactor is provided with initiator in the form of an initiator mixture.

2. The process of claim 1, wherein all initiator injection points, which are provided with initiator, are provided with initiator in the form of an initiator mixture and all initiator mixtures are obtained by being mixed in a static mixer.

3. A method for reducing the output of a high pressure tubular reactor for the homo- or copolymerization of ethylene in the presence of free-radical polymerization initiators with at least two initiator injection points, the method comprising feeding of the free-radical polymerization initiator to the first initiator injection point is discontinued or reduced to a level that the temperature of the reaction mixture in the reaction zone following the first initiator injection point does not rise more than 20° C., the reaction mixture having a flow velocity.

4. The method of claim 3, wherein more than 20 tons of ethylene homopolymer or copolymer are prepared per hour before reducing the output.

5. The method of claim 3, wherein the flow velocity of the reaction mixture remains essentially unchanged.

6. The method of claim 3, wherein the first initiator injection point of the tubular reactor and another initiator injection point of the tubular reactor are provided with no initiator or with so little initiator that the temperature of the reaction mixture does not rise more than 20° C. in the reaction zones following the first and the other initiator injection point.

7. The method of claim 3, wherein the first two initiator injection points of the tubular reactor are not provided with initiator or are provided with so little initiator that the temperature of the reaction mixture does not rise more than 20° C. in the first two reaction zones.

8. The method of claim 3, wherein no initiator is fed to the first initiator injection point of the tubular reactor.

9. The method of claim 3, wherein no initiator is fed to the first initiator injection point of the tubular reactor and no initiator is fed to another initiator injection point of the tubular reactor.

10. The method of claim 3, wherein no initiator is fed to the first two initiator injection points of the tubular reactor.

11. The method of claim 3, wherein at least one of the initiator injection points of the tubular reactor is provided with initiator in the form of an initiator mixture.

12. A process for the preparation of ethylene homopolymers or copolymers in the presence of free-radical polymerization initiators at from 100° C. to 350° C. and pressure in the range of from 160 MPa to 350 MPa in a tubular reactor with at least two spatially separated initiator injection points, wherein the injecting initiator raises the temperature of the reaction mixture in the reaction zone following the injection point, wherein the high pressure tubular reactor is operated with a reduced output by means of the method of claim 3.

13. The process of claim 12, wherein the first initiator injection point of the tubular reactor and another initiator injection point of the tubular reactor are provided with no initiator or with so little initiator that the temperature of the reaction mixture does not rise more than 20° C. in the reaction zones following the first and the other initiator injection point.

14. The process of claim 12, wherein the first two initiator injection points of the tubular reactor are not provided with initiator or are provided with so little initiator that the temperature of the reaction mixture does not rise more than 20° C. in the first two reaction zones.

15. The process of claim 12, wherein no initiator is fed to the first initiator injection point of the tubular reactor.

16. The process of claim 12, wherein no initiator is fed to the first initiator injection point of the tubular reactor and no initiator is fed to another initiator injection point of the tubular reactor.

17. The process of claim 12, wherein no initiator is fed to the first two initiator injection points of the tubular reactor.

18. The process of claim 12, wherein at least one of the initiator injection points of the tubular reactor is provided with initiator in the form of an initiator mixture.

* * * * *